United States Patent [19]

Buzzelli et al.

[11] 4,132,547
[45] Jan. 2, 1979

[54] METHOD OF PRODUCING SELF-SUPPORTING FULLY ACTIVATED IRON ELECTRODES BY THERMAL REDUCTION-SINTERING

[75] Inventors: Edward S. Buzzelli, Franklin Borough; George R. Folser, Lower Burrell, both of Pa.

[73] Assignee: Westinghouse Electric Corp., Pittsburgh, Pa.

[21] Appl. No.: 801,121

[22] Filed: May 27, 1977

[51] Int. Cl.² ............................ B22F 5/00; B22F 3/00
[52] U.S. Cl. ................................. 75/211; 75/200; 75/212; 75/222; 429/221
[58] Field of Search ................... 429/221; 75/200, 211, 75/212, 201, 222

[56] References Cited

U.S. PATENT DOCUMENTS

| | | | |
|---|---|---|---|
| 2,871,281 | 1/1959 | Moulton et al. | 429/207 |
| 3,066,178 | 11/1962 | Winkler | 429/220 |
| 3,148,056 | 9/1964 | Brodie et al. | 75/212 |
| 3,326,676 | 6/1967 | Rübel et al. | 75/212 |
| 3,453,148 | 7/1969 | Parker | 75/212 |
| 3,681,146 | 8/1972 | Baba et al. | 75/212 |
| 3,898,098 | 8/1975 | Giles | 204/2.1 |
| 3,992,222 | 11/1976 | Walsh et al. | 429/221 |

Primary Examiner—Brooks H. Hunt
Attorney, Agent, or Firm—D. P. Cillo

[57] ABSTRACT

A self-supporting electrode structure consisting of active material particles is made by: (1) mixing 100 parts of metallic iron particles, with between about 0.5 part to about 5.0 parts of a water soluble metal sulfate selected from $MgSO_4$, $CdSO_4$, $MnSO_4$, $ZnSO_4$, $BaSO_4$, $Cr_2(SO_4)_3$, $CuSO_4$, $CaSO_4$, $Li_2SO_4$, their hydrates and mixtures, as an electrochemical activator, and an amount of water effective to form a thin coating of metal sulfate on the metallic iron particles, (2) sizing the mixture to between about 10 microns to about 275 microns average particle size, (3) pressing the coated iron particles, and (4) reducing and sintering the coated iron particles at between about 700° C to about 1,000° C, in a reducing atmosphere; to provide an interconnected self-supporting metallic electrode structure consisting solely of fully charged iron active material particles coated with the metal of the additive, said electrode being capable of immediate discharge.

10 Claims, 3 Drawing Figures

METHOD OF PRODUCING SELF-SUPPORTING FULLY ACTIVATED IRON ELECTRODES BY THERMAL REDUCTION-SINTERING

BACKGROUND OF THE INVENTION

Iron electrodes for batteries are well known. McCormick, in U.S. Pat. No. 3,525,640, teaches double sintering of essentially pure, 3 to 5 micron diameter, iron particles, at 760° C to 930° C, in a hydrogen atmosphere, onto a nickel mesh support. This iron electrode, however, must then be electrochemically activated by cycling in a sulfur-containing alkaline solution.

Moulton, in U.S. Pat. No. 2,871,281, discloses activation of moist $Fe_2O_3$, by spraying with $FeSO_4$, $(NH_4)_2SO_4$, $Na_2SD_4$ or $K_2SO_4$ solution. This composition is dried and then reduced in a hydrogen atmosphere, at 500° C to 820° C, to form an active battery material containing Fe and FeS, which can be loaded into a support, to provide an iron electrode. Winkler, in U.S. Pat. No. 3,066,178, teaches superactivation of an active iron battery material containing FeS by soaking with $CuSO_4$ solution. This composition is then dried and loaded into a support to provide an iron electrode. All of these active materials must be pasted into a supporting plaque, which provides a thick, heavy electrode. Generally, these active materials must be charge-discharge cycled before they are useful.

What is needed is a low cost battery material, which in activation processing can be made into a thin, light weight, porous, structurally rigid electrode in a fully charged state, capable of immediate discharge without charge-discharge cycling.

SUMMARY OF THE INVENTION

It has been found that the above need can be met by producing substantially pure metallic iron particles, preferably by thermally reducing $Fe_2O_3$ powder at between 400° C to 1,000° C in a reducing atmosphere. The particles are then ground, preferably to an average particle size of between about 10 microns to about 275 microns. The particles are then mixed with between about 0.5 part to about 5.0 parts, per 100 parts of iron particles, of a water soluble metal sulfate selected from the group of $MgSO_4$ $CdSO_4$, $MnSO_4$, $ZnSO_4$, $BaSO_4$, $Cr_2(SO_4)_3$, $CuSO_4$, $CaSO_4$, $Li_2SO_4$, their hydrates, and their mixtures. Sufficient water is added to form a thin film of metal sulfate on the surface of the metallic iron particles.

The iron-sulfate mixture is dried, sized to between about 10 microns to about 275 microns average particle size, pressed, and then thermally reduced and sintered, at between about 700° C to about 1,000° C, in a reducing atmosphere, preferably $H_2$ gas, for between about 15 minutes to about 600 minutes, to activate and consolidate the electrodes. This process can provide a 50 mil to 150 mil electrode of about 2.5 g./cu. cm to 3.5g./cu. cm. density, and 70% to 95% porosity, having a high structural integrity. The sintered electrode needs no support and is capable of immediate discharge, providing an output of about 0.30 Ah/g. to about 0.70 Ah/g.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Figure 1:
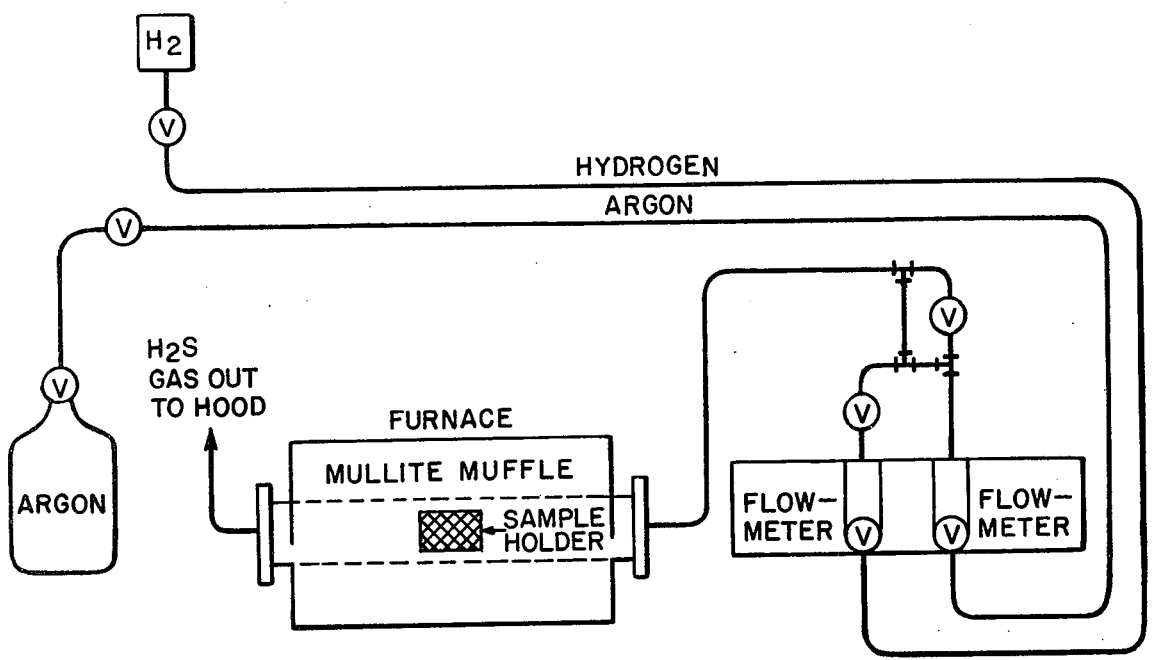
FIG. 1 shows a schematic diagram of a hydrogen reduction sintering furnace used to make the iron electrodes of this invention.

In the iron-air electrochemical cell, the iron electrode provides fuel for the electrochemical couple. In order to achieve maximum capacity per unit weight in a cell, it is necessary to provide the iron electrode with the best active material in terms of utilization, and simultaneously to reduce the weight of the inactive components, such as the supporting structure and electrode current collector. The ultimate objective would be to provide an iron electrode containing 100 per cent active material.

In the method of this invention, an activated, sintered, metallic iron electrode is provided, where the active metallic iron itself constitutes the entire electrode structure. The starting material is substantially pure iron particles. This material can be easily produced from ferric oxide ($Fe_2O_3$), which is an inexpensive, commercially available material. The $Fe_2O_3$ can be thermally reduced to metallic iron, Fe, at between about 400° C to about 1,000° C, in a reducing atmosphere, preferably $H_2$, for about 15 minutes to about 600 minutes. It can then be ground or otherwise pulverized to a powder having an average particle size of between about 10 microns to about 275 microns. These particles, consisting of essentially pure Fe are then mixed with a water soluble metal sulfate, used as an electrochemical activator.

Useful water soluble metal sulfates effective to activate the iron are selected from the group of $MgSO_4$, $CdSO_4$, $MnSO_4$, $ZnSO_4$, $BaSO_4$, $Cr_2(SO_4)_3$, $CuSO_4$, $CaSO_4$, $LiSO_4$, their hydrates, and mixtures. Preferred activators are selected from $MgSO_4$, $3CdSO_4 \cdot 8H_2O$, $MnSO_4$, $ZnSO_4$, $BaSO_4$, $Cr_2(SO_4)_3 \cdot H_2O$, $CuSO_4 \cdot 5H_2O$, $CaSO_4 \cdot 2H_2O$, $Li_2SO_4 \cdot H_2O$ and their mixtures. An especially useful activator is a mixture of $MgSO_4$ and $3CdSO_4 \cdot 8H_2O$. The Fe particles are mixed with the metal sulfate in a ratio of between about 0.5 part to about 5.0 parts, preferably between 0.8 part to 3.0 parts of metal sulfate per 100 parts of Fe particles. Use of sulfites or sulfides would present solubility problems, and would not provide a uniform adhesive coating on the iron particles. Under about 0.5 part of selected metal sulfate and little increased performance is noted. Over about 5.0 parts and the improved electrochemical performance tapers off.

The Fe-metal sulfate mixture is blended with an amount of water effective to substantially completely coat the Fe particles with a thin film of the metal sulfate additive. Usually about 30 parts to 200 parts (about 30 ml to 200 ml) of water per 100 parts of Fe particles will form a slurry and coat the Fe particles. The slurry is then generally poured onto or into a container and dried, by any suitable means, for a time and at a temperature effective to evaporate or remove most of the water, generally between about 30 minutes to 120 minutes, at about 25° C to about 75° C. The dried material is then broken up, reground or otherwise powdered, and then sized, by pouring it through a Tyler or other suitable screen system, to an average particle size of between about 10 microns to about 275 microns diameter. Over about 275 microns and problems may be encountered in later reduction and sintering steps.

The dried, sized, Fe-metal sulfate mixture is then pressed by a suitable pressing means to provide a plaque structure that can be handled. The structure is then thermally reduced, activated, and sintered at between about 700° C to 1,000° C in a reducing atmosphere, preferably $H_2$, for about 15 minutes to about 600 minutes. The particles fuse at their contact points to provide an interconnected metallic structure comprising Fe, substantially completely coated with a thin film of the metal of the additive used, and trace amounts, generally about 0.05 weight percent to about 0.75 weight percent of sulfur, generally as free sulfur. The rest of the sulfur goes off as $H_2S$, sulfate radicals and free sulfur through a hood, along with some steam.

It is believed, that during the activation-sintering step, the metal of the additive sulfate used, for example Mg, undergoes a solid state interdiffusion of atoms with the metallic iron particle surface, to form a type of alloy, or solid state mixture of the metals, as a thin film, at the metal interface which somehow contributes to improved electrochemical properties and provides improved resistance.

This electrode structure can advantageously be made very thin, i.e., from about 50 mil to about 150 mil. It will have a density of about 2.5g./cu. cm. to about 3.5g./cu. cm, a porosity of between about 70% to about 95% and high structural integrity. The porous, bonded particle structure contains 100 percent active material with no inactive support structure. This method eliminates the use of weighty supports and the need of intricate and time consuming plaque pasting or other plaque loading techniques.

This method also provides an electrode that is capable of immediate discharge, providing an output of up to about 0.70 Ah/g. of active material-structure. This method eliminates the need for charge-discharge cycling prior to use and further eliminates the need for any activation dipping or spraying steps. This method provides a very simple, inexpensive, commercially feasible method of making high output iron electrodes.

Figure 2:
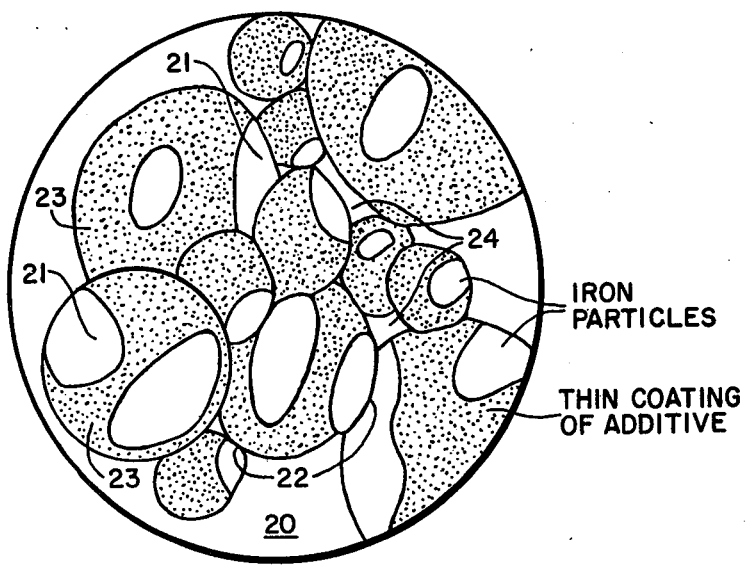
FIG. 2 shows a magnified view of the electrode structure of this invention.
Figure 3:
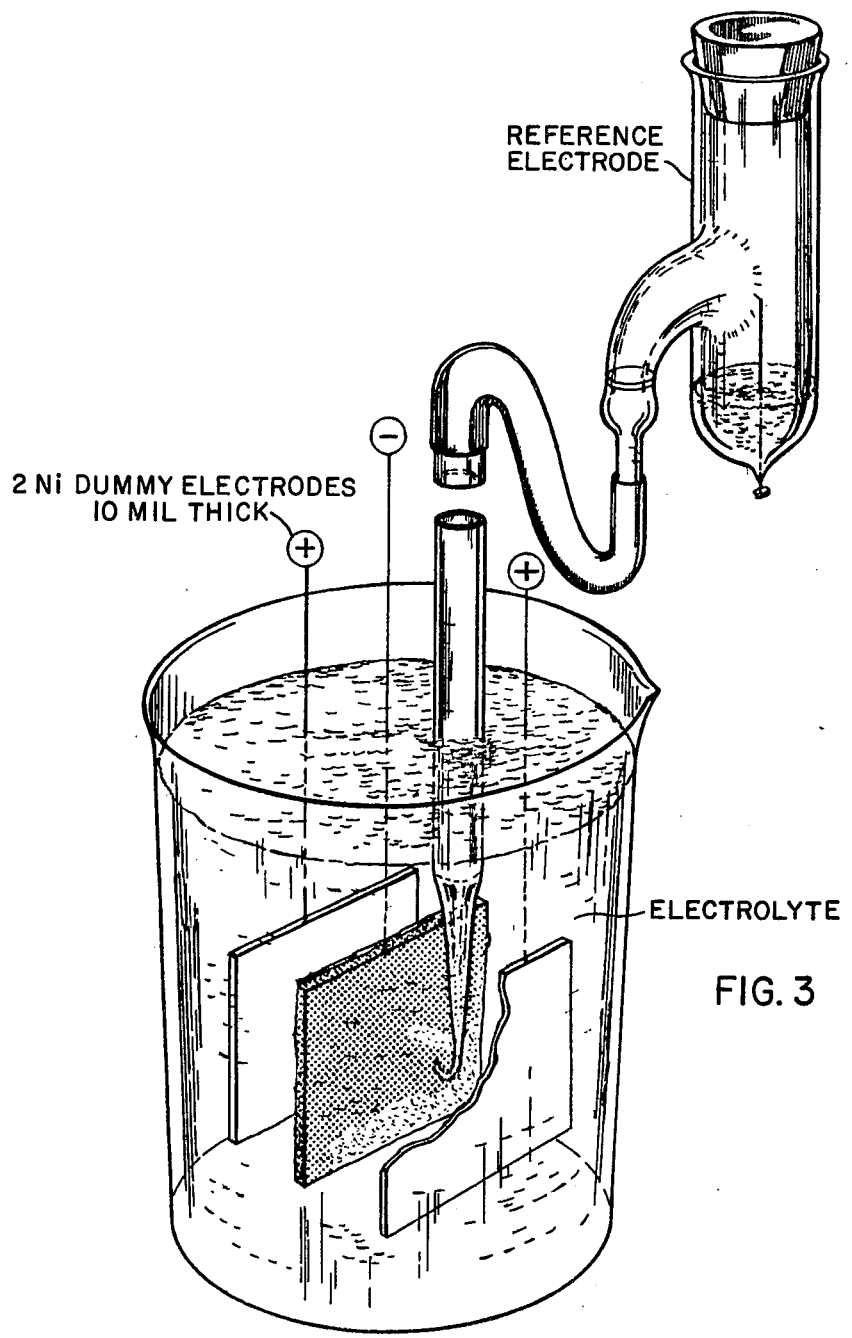
FIG. 3 shows a three dimensional view of the iron electrode test apparatus used in the Example.

Referring now to the drawings, FIG. 1 shows a schematic diagram of the furnace that can be used to reduce $Fe_2O_3$ to metallic iron and to sinter-activate the electrode. FIG. 2 shows a magnified view of the support fiber free electrode structure 20, with sintered, bonded, interconnected, relatively smooth metallic Fe active material particles 21 joined at fusion points 22 without melting, which could cause melt globules and loss of volume. The iron particles are discontinuously coated with a thin film of metal activator 23. At the interface of the metal activator and Fe particles, there may be an alloy or solid state metal mixed film (not shown). The structure is porous, as shown by the voids 24 between the joined particles. The fused metal powder structure is free of clefts and protuberances and melt globules and requires no exterior or interior support fibers or sheets, the electrode being rigid and self-supporting. FIG. 3 is an illustration of the iron electrode test cell used in the Example.

EXAMPLE 1

Approximately 80 grams of substantially pure iron particles, made from $Fe_2O_3$ powder thermally reduced in $H_2$ at 900° C for 2 hours, having an average particle size of between about 150 microns to about 250 microns was mixed with 0.8 gram of $MgSO_4$ and 0.8 gram of $3CdSO_4 \cdot 8H_2O$. After thorough mixing was achieved, 40 grams (40 ml.) of deionized water was added. Using a spatula for mixing, a creamy, homogeneous paste was obtained and the iron particles were uniformly covered with the water soluble metal sulfates.

The blend was placed into a flat container and air dried in an oven at 60° C for 1 hour. The solid mass was then crumbled to form a powder and then sized through a set of screens, so that the average particle size was below 250 microns diameter. The iron-magnesium sulfate-cadmium sulfate hydrate powder was then placed into a 100 sq. cm. square mold and flat bed pressed at 25 tons pressure, to form a loosely consolidated plaque structure that could be handled. The plaque, consisting of only the iron particles coated with the metal sulfates, with no additional supporting structure, was then placed in a Burrell Model #200 hydrogen reduction muffle furnace, similar to that shown in FIG. 1 of the drawings.

While coming up to temperature, the furnace was purged with argon gas until it reached 100° C. Then hydrogen gas was turned on at a rate of about 5,000 cc./min. When the furnace reached 900° C, it was held at this temperature for 30 minutes to reduce and sinter-activate the plaque, and produce an activated, completely consolidated iron active electrode. The furnace was then shut-off and the hydrogen gas left on until the temperature reached 100° C. At this time the hydrogen reducing gas was turned off and argon was again used to purge the system until it reached 25° C.

This method provided a self-supporting electrode, containing interconnected, bonded, iron particles substantially covered with a thin film of magnesium and cadmium, with a possible alloy of the metals, and trace amounts, about 0.1 weight percent, of substantially free sulfur. The rest of the sulfur by-products of the reduction-sintering were removed through a hood.

The electrode contained the iron activated battery particles, sintered together without any substantial melting. The electrode was structurally firm and very strong and needed no further support materials. The electrode had a density of 3.3 g./cu. cm., a porosity of about 80% to 90% and a thickness of 100 mils (0.1 inch).

The electrode was trimmed to about 4 cm. × 4 cm. and a lead wire was attached to one end. The electrode was evaluated using a standard half-cell configuration shown in FIG. 3 of the drawings. This consisted of two 10 mil thick dummy nickel electrodes spaced approximately ¾ inch from each face of the iron electrode, in a 250 ml. beaker containing warm 25 wt.% KOH electrolyte. A Hg/HgO reference electrode was positioned near one of the faces of the iron electrode. On the first discharge, without any charge-discharge cycling, the electrode delivered about 0.4 Ah/g. output (0.85 volts — vs. — Hg/HGO at 25 mA/sq. cm. in 25 wt.% KOH at 35° C.).

This test showed the usefulness of this activated iron electrode in an electrochemical cell, and illustrates its capability of immediate discharge. A number of such cells could be connected to provide a high output battery. The high output, low weight, ultrathin electrode properties of this invention, coupled with the low cost and ease of construction, make this electrode uniquely suitable as a commercial product. The other sulfates or their hydrates and mixtures described hereinabove could also be used to produce the activated, self-supporting iron electrode of this invention.

We claim:

1. A method of making a self-supporting, fully activated electrode structure consisting of iron active material particles comprising the steps of:
   (A) mixing 100 parts of metallic iron particles, consisting of essentially pure Fe, with between about 0.5 part to about 5.0 parts of a water soluble metal sulfate additive, effective to activate the iron, selected from the group consisting of $MgSO_4$, $CdSO_4$, $MnSO_4$, $ZnSO_4$, $BaSO_4$, $Cr_2(SO_4)_3$, $CuSO_4$, $CaSO_4$, $Li_2SO_4$, their hydrates and mixtures thereof, and an amount of water effective to form a thin coating of the metal sulfate on the surface of the metallic iron particles; and then
   (B) drying the mixture and sizing the mixture to provide particles having an average particle size of between about 10 microns to about 275 microns diameter; and then
   (C) pressing the coated metallic iron particles to provide a plaque; and then
   (D) reducing and sintering the plaque consisting of the coated metallic iron particles at between about 700° C to about 1,000° C, in a reducing atmosphere, to provide an interconnected, self-supporting metallic electrode structure consisting solely of fully charged metallic iron particles, consisting of essentially pure Fe, coated with the activator metal of the additive, said electrode being capable of immediate discharge.

2. The method of claim 1, wherein the additive is selected from the group consisting of $MgSO_4$, $3CdSO_4 \cdot 8H_2O$, $MnSO_4$, $ZnSO_4$, $BaSO_4$, $Cr_2(SO_4)_3 \cdot H_2O$, $CuSO_4 \cdot 5H_2O$, $CaSO_4 \cdot 2H_2O$, $Li_2SO_4 \cdot H_2O$ and mixtures thereof, and the iron particles are made from $Fe_2O_3$, thermally reduced in $H_2$ gas at between about 400° C to about 1,000° C.

3. The method of claim 1, wherein the additive is a mixture of $MgSO_4$ and $3CdSO_4 \cdot 8H_2O$ and the metallic iron particles are mixed with between 0.8 part to 3.0 parts of metal sulfate.

4. The method of claim 1, wherein the mixture is dried in step (B) for about 30 minutes to 120 minutes at about 25° C to about 75° C, and the reducing atmosphere in step (D) is $H_2$ gas.

5. The method of claim 1 wherein the electrode is about 50 mil to about 150 mil thick, and about 70% to about 95% porous.

6. The method of claim 1, where, in step (D), the iron and the metal of the additive undergo a solid state interdiffusion of atoms at their interface.

7. An electrode made by the method of claim 1.

8. A method of making a self-supporting, fully activated electrode structure consisting of iron active material particles comprising the steps of:
   (A) mixing 100 parts of metallic iron particles, consisting of essentially pure Fe, with between about 0.8 part to about 3.0 parts of a water soluble metal sulfate additive, effective to activate the iron, selected from the group consisting of $MgSO_4$, $CdSO_4$, their hydrates and mixtures thereof, and an amount of water effective to form a thin coating of the metal sulfate on the surface of the metallic iron particles; and then
   (B) drying the mixture and sizing the mixture to provide particles having an average particle size of between about 10 microns to about 275 microns diameter; and then
   (C) pressing the coated metallic iron particles to provide a plaque; and then
   (D) reducing and sintering the plaque consisting of the coated metallic iron particles at between about 700° C to about 1,000° C, in a hydrogen gas reducing atmosphere, to provide an interconnected, self-supporting metallic electrode structure consisting solely of fully charged metallic iron particles, consisting of essentially pure Fe, coated with the activator metal of the additive, said electrode being capable of immediate discharge.

9. The method of claim 8, wherein the additive is selected from the group consisting of $MgSO_4$, $3CdSO_4 \cdot 8H_2O$, and mixtures thereof.

10. The method of claim 8, where, in step (D), the iron and the metal of the additive undergo a solid state interdiffusion of atoms at their interface.

* * * * *